(12) United States Patent
Sullivan et al.

(10) Patent No.: US 8,447,874 B2
(45) Date of Patent: May 21, 2013

(54) WEB PAGE DATA STREAMING

(75) Inventors: Blake Sullivan, Redwood City, CA (US); Max Starets, Lexington, MA (US); Edward J. Farrell, Los Gatos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 464 days.

(21) Appl. No.: 12/025,234

(22) Filed: Feb. 4, 2008

(65) Prior Publication Data
US 2009/0198828 A1    Aug. 6, 2009

(51) Int. Cl.
*H06F 15/16* (2006.01)

(52) U.S. Cl.
USPC ......... 709/231; 709/229; 709/230; 709/232; 711/150; 711/151; 711/120; 711/129

(58) Field of Classification Search
USPC ............... 709/231, 236; 703/2; 715/853, 234, 715/723
See application file for complete search history.

(56) References Cited

U.S. PATENT DOCUMENTS

| | | | | |
|---|---|---|---|---|
| 6,226,642 B1* | 5/2001 | Beranek et al. | ............ | 707/10 |
| 6,931,418 B1* | 8/2005 | Barnes | ............ | 707/776 |
| 7,328,242 B1* | 2/2008 | McCarthy et al. | ............ | 709/204 |
| 2001/0051998 A1* | 12/2001 | Henderson | ............ | 709/217 |
| 2002/0112033 A1* | 8/2002 | Doemling et al. | ............ | 709/219 |
| 2004/0107250 A1* | 6/2004 | Marciano | ............ | 709/204 |
| 2004/0123238 A1* | 6/2004 | Hefetz et al. | ............ | 715/513 |
| 2006/0184913 A1* | 8/2006 | Coulthard et al. | ............ | 717/104 |
| 2007/0150488 A1* | 6/2007 | Barsness et al. | ............ | 707/100 |
| 2007/0179852 A1* | 8/2007 | Martin et al. | ............ | 705/14 |
| 2007/0220493 A1* | 9/2007 | Morizawa | ............ | 717/126 |
| 2007/0233823 A1* | 10/2007 | Traub et al. | ............ | 709/220 |
| 2008/0134158 A1* | 6/2008 | Salz et al. | ............ | 717/148 |
| 2008/0201118 A1* | 8/2008 | Luo | ............ | 703/2 |
| 2008/0301177 A1* | 12/2008 | Doherty | ............ | 707/102 |

OTHER PUBLICATIONS citeseerx.ist.psu.edu/viewdoc/download?doi=10.1.1.10...pdf "A multithreaded Java Framework for Information Extraction in the Context of Enterprise Application Integration"—Univ. of Mannheim, Jun. 2006.*
http://www.cs.duke.edu/courses/cps210/spring06/papers/eraser.pdf "Eraser: A Dynamic Data Race Detector for Multithreaded Programs"—Univ. of Washington, 1997.*

* cited by examiner

*Primary Examiner* — Krista Zele
*Assistant Examiner* — Randy Scott
(74) *Attorney, Agent, or Firm* — Miles & Stockbridge P.C.

(57) ABSTRACT

A system generates a web page that includes a plurality of embedded data windows. The system receives a request for the web page from a browser and in response generates and displays a frame for the web page on the browser. The frame includes holes for the embedded data windows. The system also receives a data streaming request for each of the embedded data windows and determines if the data streaming requests are thread-safe. For all the data streaming requests that are thread-safe, the system generates a parallel thread to fetch the data for each corresponding data streaming requests. When the data has been fetched for a particular data streaming requests, the data is rendered and streamed to the browser where it is displayed in place of the hole by the browser.

16 Claims, 4 Drawing Sheets

Fig. 4

WEB PAGE DATA STREAMING

FIELD OF THE INVENTION

One embodiment is directed generally to Internet web pages, and in particular to streaming data to a web page.

BACKGROUND INFORMATION

When Hypertext Markup Language ("HTML")-based Internet web browsers were initially introduced, most Internet web pages were considered "static". A static web page generally means that the associated web server will always respond to web page requests with the same set of HTML and associated web content, regardless of the user's identity or the retrieval context.

However, as the Internet has evolved, "dynamic" web pages are increasingly being created and deployed to create an interactive experience for the user. A dynamic web page generally means that content (e.g., data, text, images, form fields, etc.) on the web page can change in response to different contexts or conditions. Many dynamic web pages include multiple data tables and portlets that may be in the form of non-overlapping windows and that may each display data requested from disparate data sources, or that may each display data from the same data source but require separate data requests. For example, a single dynamic web page may include one data table that displays current inventory information that is retrieved from an organization's inventory database, and may include a portlet that displays weather reports from an external weather database.

Because data in some dynamic web pages may be received from disparate data sources or otherwise require separate data requests, the time to retrieve the data may vary. In the above example, the inventory data may be quickly retrievable but it may take much longer to retrieve the weather information. However, in a typical request for a dynamic web page, the web page is not displayed to a user on a browser until all the data has been fetched. Therefore, the generation and display of a web page can be substantially delayed depending on the time required to fetch the "slowest" data.

SUMMARY OF THE INVENTION

One embodiment is a system for generating a web page that includes a plurality of embedded data windows. The system receives a request for the web page from a browser and in response generates and displays a frame for the web page on the browser. The frame includes holes for the embedded data windows. The system also receives a data streaming request for each of the embedded data windows and determines if the data streaming requests are thread-safe. For all the data streaming requests that are thread-safe, the system generates a parallel thread to fetch the data for each corresponding data streaming requests. When the data has been fetched for a particular data streaming requests, the data is rendered and streamed to the browser where it is displayed in place of the hole by the browser.

BRIEF DESCRIPTION OF THE DRAWINGS

FIG. 4 is a web page or user interface that illustrates two frames that correspond to the frames of FIG. 3 after the holes have been filled with data.

DETAILED DESCRIPTION

One embodiment creates a web page frame that is displayed on a browser while data for multiple data tables or portlets is requested. As the data for each data request is received, the data is streamed to the web page and displayed to the user, without waiting for all of the requested data to be received.

Figure 1:
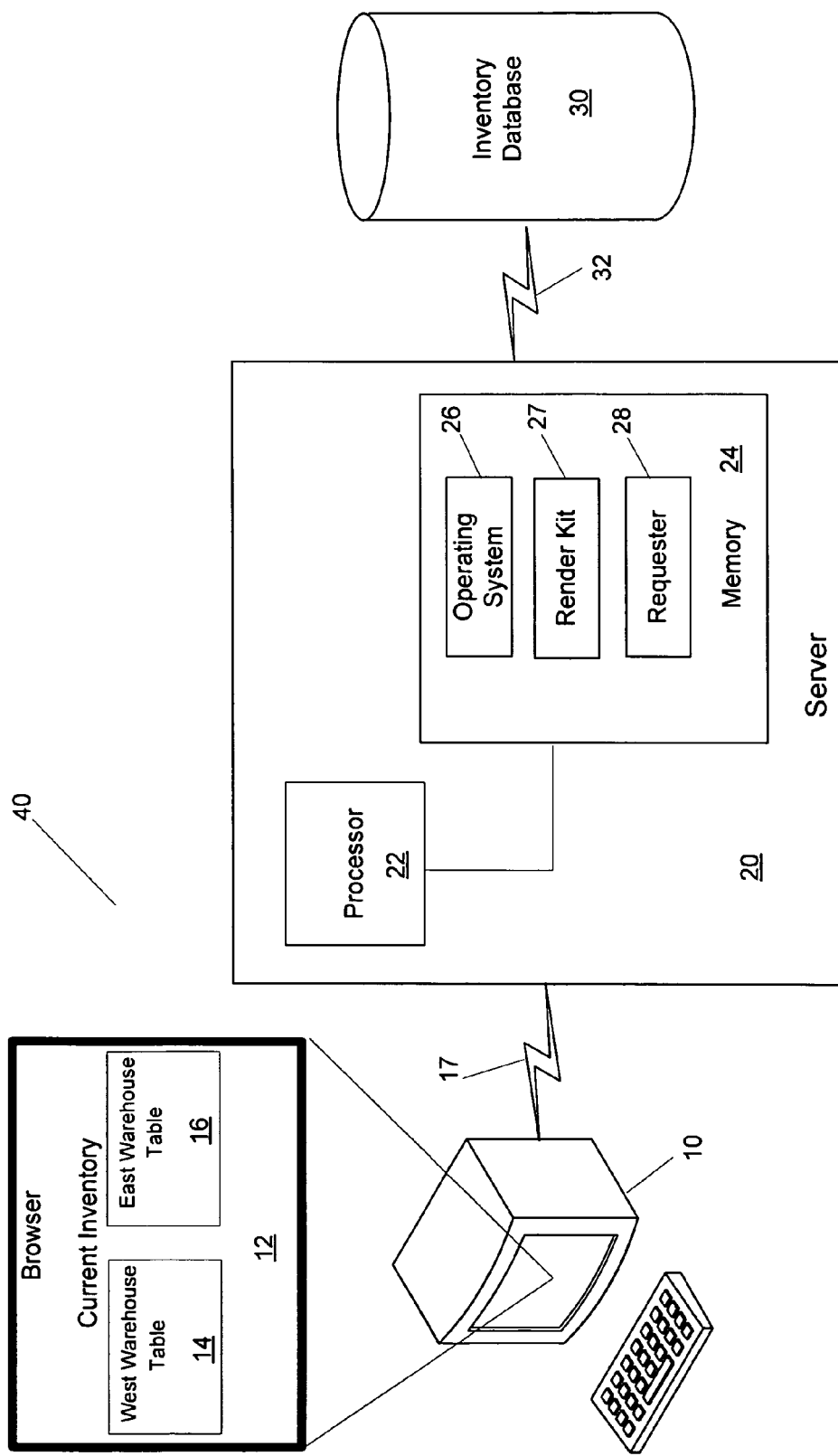
FIG. 1 is a block diagram of a web page data streaming system in accordance with one embodiment.

FIG. 1 is a block diagram of a web page data streaming system 40 in accordance with one embodiment. System 40 includes a client computer 10 that generates and displays a web page 12 using a browser or some other user interface. Client computer 10 includes a processor and memory for storing instructions, and can be any type of computer or other computing device that provides a user interface that can generate and display a web page, including a personal digital assistance ("PDA"), telephone, etc. In one embodiment, web page 12 is displayed using the Internet Explorer browser from Microsoft Corp.

Client computer 10 is coupled to a server 20 via a link 17. Link 17 is any type of local or network connection that enables client computer 10 to communicate and exchange data with server 20. In one embodiment, link 17 is the Internet. Server 20 includes a processor 22 coupled to memory 24. Processor 22 can be any type of general purpose or special purpose processor, and memory 24 can be any type of memory or other computer readable media that stores instructions that are executed by processor 22. Memory 24 includes an operating system 26, a render kit 27, and a requester 28. Memory 24 can store other data in addition to instructions.

In one embodiment, server 20 generates web pages that are transmitted and displayed on client computer 10 in response to a HyperText Transfer Protocol ("HTTP") or other type of request from client computer 10. In one embodiment, processor 22 executes Java Platform, Enterprise Edition, or "J2EE", from Sun Microsystems, Inc. to generate the web pages. In this embodiment, client computer 10 executes JavaScript and JavaServer Faces ("JSF"), also from Sun Microsystems, Inc., to display web page 12 on client computer 10.

Server 20 is coupled, either locally or remotely, to a database 30 via link 32. In one embodiment, database 30 is a relational database and stores information regarding the inventory of an organization. In one embodiment, database 30 is multi-threading so that it can receive and respond to multiple data queries in parallel. Database 30 may form an overall data tier that can comprise multiple different databases that may store disparate data and that may be in different locations.

Render kit 27 in one embodiment includes renderers that render script logic, such as JavaScript, or renders data so that it is compatible with the modeling language (e.g., HTML, JSF, etc.) that is used by web page 12. Requester 28 generates queries and requests data from database 30, and streams the data back to client computer 10 in response to web page requests.

In one embodiment, web page 12 includes multiple data tables 14 and 16 that display requested data, such as inventory data from an organization's "West Warehouse" (table 14) and "East Warehouse" (table 16). The data that populates tables 14 and 16 is stored in database 30. Web page 12 may include other "embedded documents" or "embedded data windows" that display data, in addition to tables 14 and 16, such as portlets, etc.

In some prior art implementations, a user at a client computer would request web page 12 through a browser. The browser would generate a request for the web page from a web server, which would be the server identified by the Uniform Resource Locator ("URL") of the web page request. The server, in response, would request the data for tables 14 and 16 from database 30 serially in a single thread (i.e., a single query for each table). When the server received all of the requested data, the server would generate web page 12 and transmit it to the client computer. The client computer would then display web page 12 in a browser. Therefore, in these prior art implementations, web page 12 is not displayed to a user until all of the necessary data for data tables 14 and 16 has been fetched from database 30.

Figure 2:
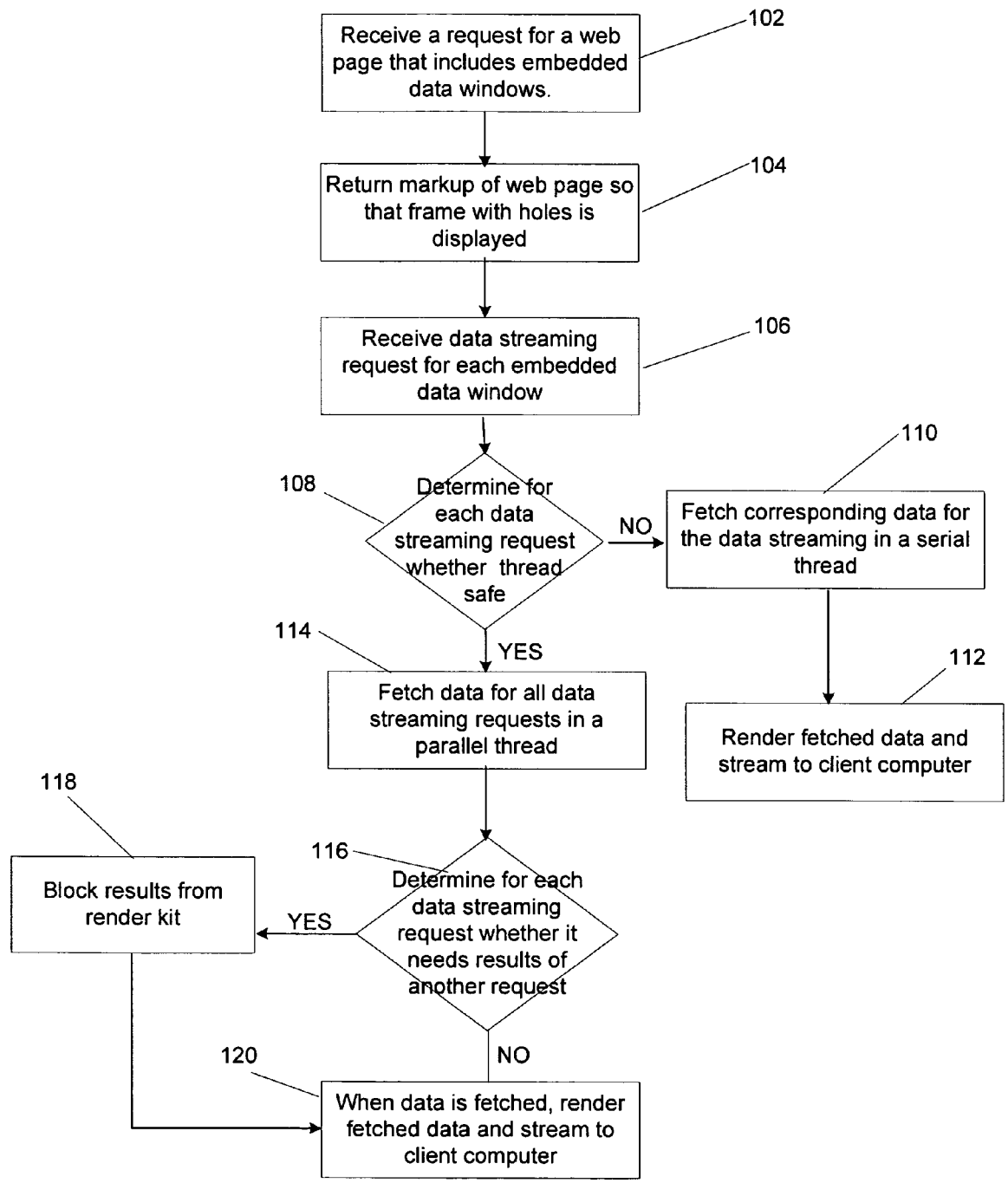
FIG. 2 is a flow diagram of the functionality of the system of FIG. 1 in accordance with one embodiment when a user at a client computer requests a web page.

Other prior art implementations attempt to speed up the process by requesting the data for tables 14 and 16 on multiple threads. However, this known prior art implementation uses JSF, which is single threading, and as a result it must abstract each thread request into separate JSF models that must be coordinated. Further, this prior art implementation does not solve the problem of having to wait until all of the data is fetched before web page 12 is displayed FIG. 2 is a flow diagram of the functionality of system 40 in accordance with one embodiment when a user at client computer 10 requests web page 12 by, for example, clicking in the browser on the URL that corresponds to web page 12. In one embodiment, the functionality of the flow diagram of FIG. 2 is implemented by software stored in memory or other computer readable or tangible medium, and executed by a processor. In other embodiments, the functionality can be performed by hardware, or any combination of hardware and software.

At 102, client computer 10 through the browser generates a request for web page 12. The request is received by server 20. In one embodiment, web page 12 has at least one embedded data window, such as data tables 14 and 16. In one embodiment, data tables 14 and 16 in web page 12 are comprised of "IFrame" HTML elements or tags or other equivalent types of elements so that a portion or "frame" of web page 12 can be displayed on client computer 10 with "holes" in the area where data tables 14 and 16 would be located before the data for data tables 14 and 16 is available. In one embodiment, a symbol or text will appear in the "empty" data tables 14 and 16 to indicate to the user that the tables will be filled with data when the data is available. The browser on client computer 10 further provides notification when new data for web page 12 is available so that JavaScript or some other function executing on computer 10 can place it in the appropriate data table 14, 16.

Figure 3:
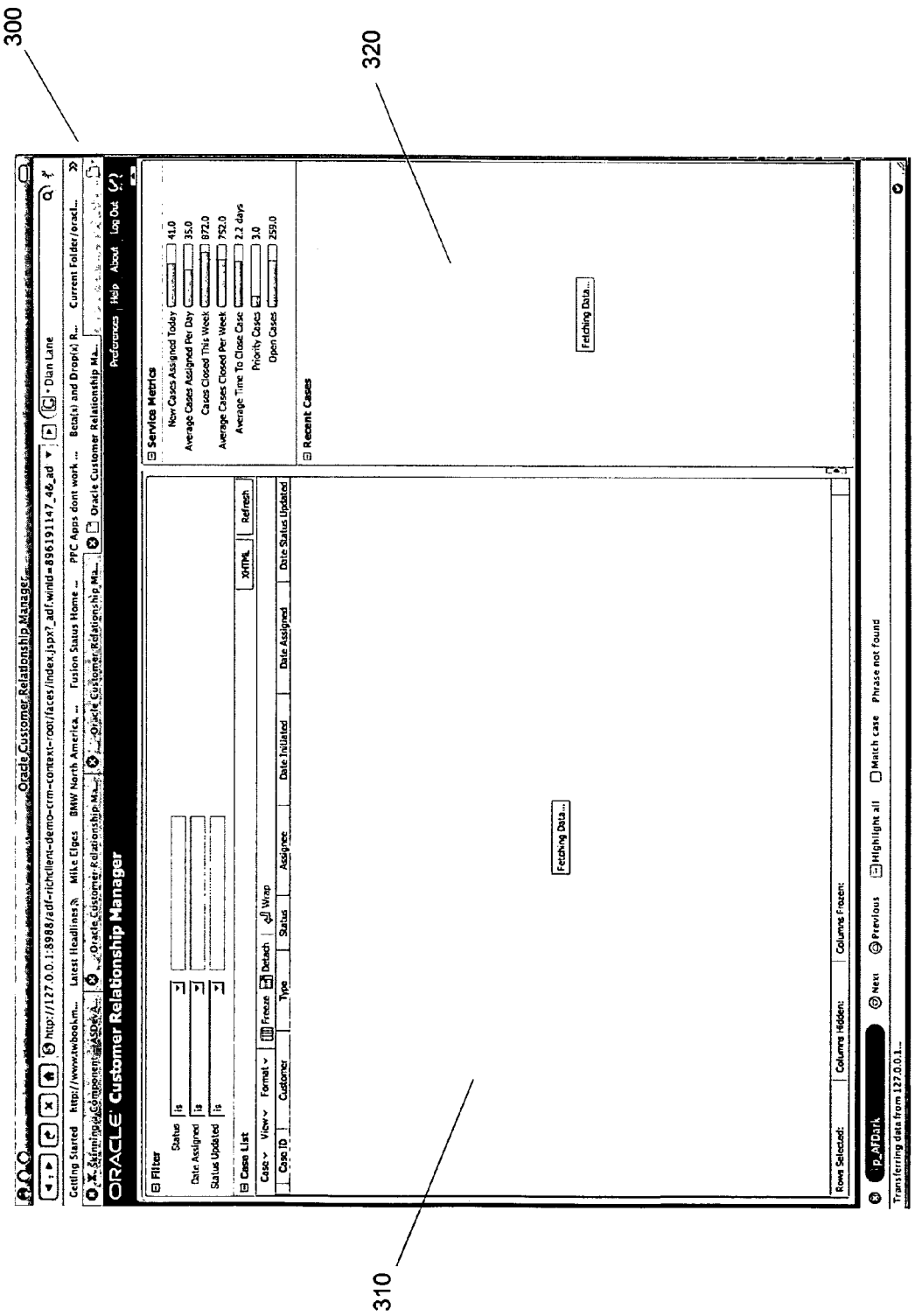
FIG. 3 is a web page or user interface that illustrates two empty frames with holes before data for the frames is available.

At 104, server 20 returns a markup for web page 12 immediately so that a frame portion of web page 12 can be displayed with holes for data tables 14 and 16 if the data for those tables is not yet available. FIG. 3 is a web page or user interface 300 that illustrates two empty frames 310, 320 with holes before data for the frames is available. Each frame 310, 320 displays a "Fetching Data . . ." message to inform the user that data is forthcoming.

Referring again to FIG. 2, at 106 server 20 receives from client computer 12 a "data streaming request" for each of the data tables 14 and 16 or other embedded data windows that require data. Each data streaming request may include details of where the needed data is located. For example, the data for table 14 may be located in rows 100-200 of database 30. Each data streaming request is registered on requester 28. In one embodiment, each data streaming request is comprised of a model such as a JSF tag. In one embodiment, the data streaming requests are received in conjunction with the web page request at 102 rather than opening a separate connection between client computer 10 and server 20 at 106.

At 108, for each data streaming request, requester 28 determines if the data streaming request is thread-safe (i.e., is compatible with multi-threading). In one embodiment, a data streaming request is thread-safe if the data backend or data source (e.g., database 30) is multi-threadable and therefore can handle parallel requests.

If the data streaming request is determined to not be thread-safe at 108, then at 110 the data that corresponds to each data streaming request is fetched one at a time serially on a serial request thread. In one embodiment, this allows for compatibility with the base JSF. In one embodiment, the data fetch is a database query of database 30.

At 112, when the requested data is returned in response to each data streaming request data fetch, a renderer in render kit 27 renders all components in context and the results are streamed back to client computer 10 and displayed immediately in the corresponding data table 14 and 16.

If the data streaming request is determined to be thread-safe at 108, at 114 a data fetch for all threaded data streaming requests is executed by requester 28 in parallel threads. In one embodiment, the data fetch is a database query of database 30.

At 116, it is determined if a threaded data streaming request needs the results of another threaded data streaming request. If yes, the data results are blocked from render kit 27 at 118 until the threaded data streaming request that is dependent on completes. When the dependent request is completed, flow moves to 120

Figure 4:
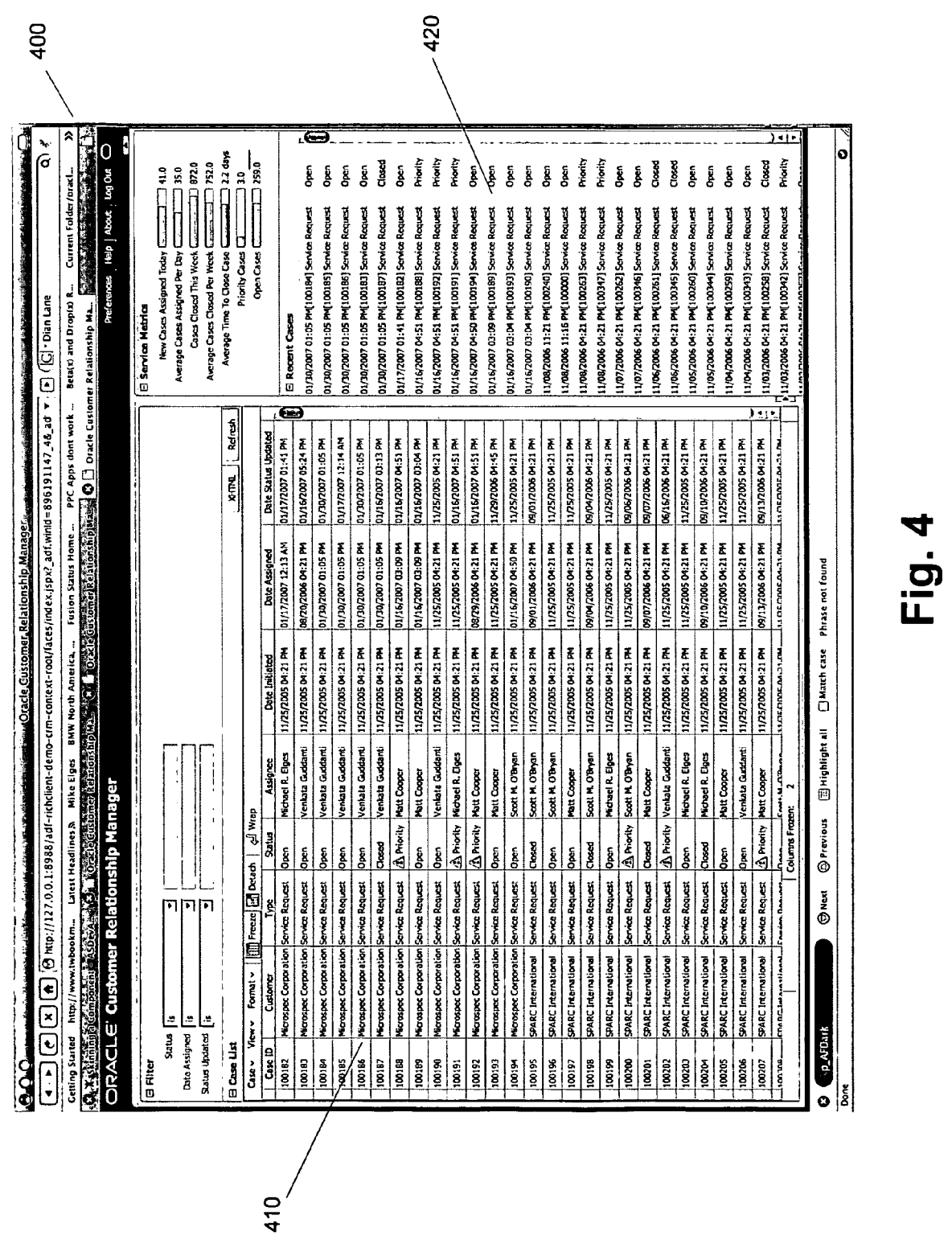

At 120, when the results of a threaded data streaming request is complete, an indication that the data is ready is queued up on render kit 27. When it is ready, the appropriate renderer renders the components in the correct context, and the result is streamed to client computer 10. In one embodiment, only the model's component is rendered on the request thread so that render kit 27 is compliant with JSF. As the data is streamed to client computer 10, it is displayed on the corresponding data tables 14 and 16. FIG. 4 is a web page or user interface 400 that illustrates two frames 410, 420 that correspond to frames 310, 320 of FIG. 3 after the holes have been filled with data.

As disclosed, embodiments of the present invention enable the frame of a web page to be displayed before data that populates one or more embedded data windows. The data that is threadable is then fetched in a parallel stream and as the data for a particular embedded data window comes available that data is streamed to the corresponding embedded data window. Therefore, at least portions of a web page can be displayed to a user before all of the data needed to populate the embedded data windows has been fully fetched.

Several embodiments are specifically illustrated and/or described herein. However, it will be appreciated that modifications and variations of are covered by the above teachings and within the purview of the appended claims without departing from the spirit and intended scope of the invention.

What is claimed is:

1. An apparatus that generates a web page that includes a plurality of embedded data windows, the apparatus comprising:
  a processor programmed to perform as:
    a requester that receives a first data streaming request for a first embedded data window of the plurality of embedded data windows, and that receives a second data streaming request for a second embedded data window of the plurality of embedded data windows, wherein the first data streaming request requests data from a first database that is determined to be multi-threadable, the second data streaming request requests data from a second database that is determined to not be multi-threadable, and the first data streaming request is one of a plurality of data streaming requests from databases that are determined to be multi-threadable; and a generator that generates a parallel thread for the first data streaming request and for all other data streaming requests of the plurality of data streaming requests to fetch the corresponding data in parallel from the databases that are determined to be multi-threadable, and that generates a serial data streaming request thread for the second data streaming request to fetch the corresponding data serially from the second database; and a render kit that renders a first fetched data fetched by the first data streaming request, streams the first rendered data to the first embedded data window before all of a second fetched data has been fetched by the second data streaming request, and the render kit displays an indication in the second embedded data window that the second embedded data window will be filled by the second fetched data.

2. The apparatus of claim 1, wherein a browser inserts the first rendered data into the first embedded data window.

3. The apparatus of claim 1, wherein the render kit renders the second fetched data corresponding to the second data streaming request, and the render kit streams the first rendered data to a browser before the second fetched data is rendered.

4. The apparatus of claim 1, wherein the requester determines if a third data streaming request requires a result of a fourth data streaming request.

5. The apparatus of claim 1, wherein a web page frame is adapted to be displayed on a browser and the frame comprises a hole for the first embedded data window before the first rendered data is streamed.

6. The apparatus of claim 5, wherein the frame is an IFrame.

7. The apparatus of claim 1, wherein the web page comprises JavaServer Faces components.

8. A method of generating a web page that includes a plurality of embedded data windows, comprising:

receiving a first data streaming request for a first embedded data window of the plurality of embedded data windows;

receiving a second data streaming request for a second embedded data window of the plurality of embedded data windows, wherein the first data streaming request requests data from a first database that is determined to be multi-threadable, the second data streaming request requests data from a second database that is determined to not be multi-threadable, and the first data streaming request is one of a plurality of data streaming requests from databases that are determined to be multi-threadable;

generating a parallel thread for the first data streaming request and for all other data streaming requests of the plurality of data streaming requests to fetch the corresponding data in parallel from the databases that are determined to be multi-threadable;

generating a serial data streaming request thr thread for the second data streaming request to fetch the corresponding data serially from the second database;

rendering a first fetched data fetched by the first data streaming request;

streaming the first rendered data to the first embedded data window before all of a second fetched data has been fetched by the second data streaming request; and displaying an indication in the second embedded data window that the second embedded data window will be filled by the second fetched data.

9. The method of claim 8, further comprising inserting the first rendered data into the first embedded data window.

10. The method of claim 8, further comprising rendering the second fetched data corresponding to the second data streaming request, and streaming the first rendered data to a browser before the second fetched data is rendered.

11. The method of claim 8, further comprising determining if a third data streaming request requires a result of a fourth data streaming request.

12. A non-transitory computer readable medium having instructions stored thereon that, when executed by a processor, causes the processor to:

receive a request for a web page, wherein the web page comprises a plurality of embedded data windows;

receive a first data streaming request for a first embedded data window of the plurality of embedded data windows;

receive a second data streaming request for a second embedded data window of the plurality of embedded data windows, wherein the first data streaming request requests data from a first database that is determined to be multi-threadable, the second data streaming request requests data from a second database that is determined to not be multi-threadable, and the first data streaming request is one of a plurality of data streaming requests from databases that are determined to be multi-threadable;

generate a parallel thread for the first data streaming request and for all other data streaming requests of the plurality of data streaming requests to fetch the corresponding data in parallel from the databases that are determined to be multi-threadable;

generate a serial data streaming request thread for the second data streaming request to fetch the corresponding data serially from the second database;

render a first fetched data fetched by the first data streaming request;

stream the first rendered data to a first embedded data window before all of a second fetched data has been fetched by the second data streaming request; and display an indication in the second embedded data window that the second embedded data window will be filled by the second fetched data.

13. The computer readable medium of claim 12, further causing the processor to insert the first rendered data into the first embedded data window.

14. The computer readable medium of claim 12, further causing the processor to render the second fetched data corresponding to the second data streaming request, and stream the first rendered data to a browser before the second fetched data is rendered.

15. The computer readable medium of claim 12, wherein the instructions cause the processor to determine if a third data streaming request requires a result of a fourth data streaming request.

16. The computer readable medium of claim 12, wherein the web page comprises JavaServer Faces components.

\* \* \* \* \*

UNITED STATES PATENT AND TRADEMARK OFFICE
CERTIFICATE OF CORRECTION

PATENT NO. : 8,447,874 B2
APPLICATION NO. : 12/025234
DATED : May 21, 2013
INVENTOR(S) : Sullivan et al.

Page 1 of 1

It is certified that error appears in the above-identified patent and that said Letters Patent is hereby corrected as shown below:

In the Specification:

In column 3, line 25, after "displayed" insert -- . --.

In column 4, line 32, after "120" insert -- . --.

In the Claims:

In column 6, line 1, in Claim 8, after "request" delete "thr".

Signed and Sealed this
Tenth Day of September, 2013

Teresa Stanek Rea
*Acting Director of the United States Patent and Trademark Office*